US006349239B2

(12) United States Patent
Orikasa et al.

(10) Patent No.: US 6,349,239 B2

(45) Date of Patent: *Feb. 19, 2002

(54) METHOD FOR MANUFACTURING A LIQUID JET RECORDING HEAD

(75) Inventors: Tsuyoshi Orikasa, Musashimurayama; Koji Yamakawa, Yokohama; Hiroyuki Kigami, Ebina; Kimiyuki Hayasaki; Hisashi Fukai, both of Yokohama; Takayuki Ono; Masayoshi Ohkawa, both of Kawasaki, all of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/041,013

(22) Filed: Mar. 12, 1998

(30) Foreign Application Priority Data

| | | |
|---|---|---|
| Mar. 12, 1997 | (JP) | 9-076608 |
| Jul. 16, 1997 | (JP) | 9-207232 |
| Feb. 26, 1998 | (JP) | 10-062148 |

(51) Int. Cl.[7] .............. G06F 19/00

(52) U.S. Cl. .............. 700/117; 347/63; 347/85; 347/87; 347/95

(58) Field of Search .............. 700/117; 347/63, 347/86, 85, 87, 93, 65, 92, 67; 710/69

(56) References Cited

U.S. PATENT DOCUMENTS 4,313,124 A 1/1982 Hara .............. 346/140 R
4,345,262 A 8/1982 Shirato et al. .............. 346/140 R
4,459,600 A 7/1984 Sato et al. .............. 346/140 R
4,463,359 A 7/1984 Ayata et al. .............. 346/1.1
4,558,333 A 12/1985 Sugitani et al. .............. 346/140 R
4,608,577 A 8/1986 Hori .............. 346/140 R
4,723,129 A 2/1988 Endo et al. .............. 346/1.1

(List continued on next page.)

FOREIGN PATENT DOCUMENTS

JP 54-56847 5/1979
JP 59-123670 7/1984

(List continued on next page.)

*Primary Examiner*—Ayaz Sheikh
*Assistant Examiner*—Firmin Backer
(74) *Attorney, Agent, or Firm*—Fitzpatrick, Cella, Harper & Scinto

(57) ABSTRACT

A method for manufacturing a liquid jet recording head comprises of the steps of calculating the difference between the distance B from the first heater on the element substrate to the cut face of the element substrate and the distance A from the first flow path groove on the ceiling plate to the abutment reference of the ceiling plate, measuring the amounts of deviation in the positional precisions in the state where the element substrates and the ceiling plates are actually positioned, working out a correction value from the distributional condition of such deviations, feeding back the correction value for determining the corrected amount of retraction. Then, after the abutment reference of the ceiling plate is allowed to abut upon the cut face of the element substrate by means of a push jig, retraction is performed by moving the ceiling plate by means of a retraction jig in the reverse direction with respect to the element substrate, hence positioning the ceiling plate and the element substrate. With the method thus arranged, it is made possible to perform positioning in a higher precision at lower costs with a shorter tact time, thus manufacturing a highly precise and highly reliable liquid jet recording head.

14 Claims, 6 Drawing Sheets

U.S. PATENT DOCUMENTS

| | | | | | |
|---|---|---|---|---|---|
| 4,740,796 | A | | 4/1988 | Endo et al. | 346/1.1 |
| 4,914,562 | A | * | 4/1990 | Abe et al. | 347/63 |
| 5,086,307 | A | * | 2/1992 | Noguchi et al. | 347/65 |
| 5,305,521 | A | | 4/1994 | Inaba et al. | 29/890.1 |
| 5,608,442 | A | * | 3/1997 | Bennefeld et al. | 347/211 |
| 5,650,807 | A | * | 7/1997 | Abe et al. | 347/43 |
| 5,930,895 | A | * | 8/1999 | Orikasa et al. | 29/890.1 |
| 5,992,981 | A | * | 11/1999 | Sugitani et al. | 347/63 |

FOREIGN PATENT DOCUMENTS

| | | |
|---|---|---|
| JP | 59-138461 | 8/1984 |
| JP | 60-71260 | 4/1985 |
| JP | 4-171126 | 6/1992 |
| JP | 4-171130 | 6/1992 |
| JP | 4-171163 | 6/1992 |
| JP | 7-89073 | 4/1995 |

* cited by examiner

METHOD FOR MANUFACTURING A LIQUID JET RECORDING HEAD

BACKGROUND OF THE INVENTION

1. Field of the Invention

The present invention relates to a method for manufacturing a liquid jet recording head used for a liquid jet recording apparatus or the like. More particularly, the invention relates to a method for manufacturing a liquid jet recording head which is structured by combining an element substrate having an array of discharge energy generating elements with a ceiling plate having arrays of discharge ports and flow path grooves.

2. Related Background Art

A liquid jet recording head used for a liquid jet recording apparatus or the like comprises an element substrate having a plurality of discharge energy generating elements (electrothermal converting elements, for example) formed at given intervals, and a ceiling plate having a plurality of discharge ports formed for discharging ink or some other liquid, as well as a plurality of flow path grooves conductively connected with each of the discharge ports. The element substrate and the ceiling plate are combined and bonded in a state where the discharge energy generating elements, the discharge ports, and the flow path grooves are positioned exactly. Then, the head is structured to apply discharge energy to liquid in each of the flow path grooves by means of discharge energy generating elements, thus discharging liquid from the discharge ports as droplets to record prints on a recording medium.

As shown in FIGS. 8A and 8B, a liquid jet recording head of the kind comprises an element substrate (heater board) 51 having cut faces 51*a* and 51*a* on both ends thereof, which is provided with a plurality of discharge energy generating elements (electrothermal transducing devices or heaters) 52 formed and arranged by means of micro-precision etching technologies and techniques on the element substrate at given intervals; and a ceiling plate 53 having a plurality of discharge ports 54 formed in a given precision by use of laser processing or the like, as well as a plurality of flow path grooves 55 conductively connected with each of the discharge ports, and also, a common liquid chamber 56 and a liquid supply inlet port 57. The element substrate 51 and the ceiling plate 53 are fixed by the application of bonding agent or by use of a spring or the like in a state that the respective discharge energy generating elements 52 on the element substrate 51, and the discharge ports 54 and the flow path grooves 55 on the ceiling plate 53 are positioned correspondingly, thus forming a liquid jet recording head.

Now, however, when an element substrate of the kind is combined with the ceiling plate, the accuracy of micron order is required for positioning the discharge energy generating elements on the element substrate, and the discharge ports and flow path grooves of the ceiling plate. In this respect, there are disclosed in Japanese Patent Application Laid-Open No. 4-171126, Japanese Patent Application Laid-Open No. 4-171130, and Japanese Patent Application Laid-Open No. 4-171163, among some others, methods for manufacturing an liquid jet recording head wherein positioning is made precisely adjustable when the element substrate and ceiling plate are combined. These methods for manufacturing a liquid jet recording head are such that at first, the positions of the discharge energy generating elements (heaters), which should be formed on an element substrate (heater board), are measured by means of image processing or the like, and then, a ceiling plate is allowed to shift onto the element substrate, and that the ceiling plate is subsequently moved relatively with respect to the element substrate, while measuring the positions of the discharge ports or flow path grooves formed on the ceiling plate by means of image processing or the like, so that the positions of discharge ports or the flow path grooves agree with those of the discharge energy generating elements on the element substrate. In this manner, the element substrate and the ceiling plate are arranged, and when the discharge energy generating elements, discharge ports, and flow path grooves are positioned exactly in agreement with each other, the substrate and plate are bonded and fixed by the application of a bonding agent or by use of a spring or the like.

Also, between the discharge energy generating elements (heaters) formed on the element substrate, there are arranged recessed portions, respectively, which engage with the flow path walls that constitute the flow path grooves of the ceiling plate. Then, the end face of the element substrate is allowed to abut upon the reference surface which is provided for the ceiling plate in advance. After that, the ceiling plate is caused to shift by the application of vibrations. In this manner, the flow path walls of the ceiling plate engages with the recessed portions arranged on the element substrate. This method, which is disclosed in the specification of Japanese Patent Application Laid-Open No. 7-89073 filed by the applicant hereof, makes it possible to position the element substrate and the ceiling plate quickly. Further, the applicant hereof has proposed a method wherein an abutment reference is arranged in advance for the ceiling plate for use of its bonding with the element substrate, and then, after the ceiling plate has shifted onto the element substrate, the end face of the element substrate is caused to abut upon the abutment reference of the ceiling plate, hence making it possible to execute the positioning of the element substrate and ceiling plate quickly with ease.

However, each of the conventional methods for manufacturing a liquid jet recording head that have been described above still has problems yet to be solved as given below.

In other words, as to the method wherein the positions of the discharge energy generating elements on the element substrate are measured by means of image processing or the like, and the element substrate and the ceiling plate are positioned by moving them relatively, while measuring the positions of the discharge ports of the ceiling plate by means of the image processing or the like, an operation is needed to move the ceiling plate after the positions of the discharge energy generating elements on the element substrate have been measured. Further, it is required to repeatedly measure the positions of the discharge ports of the ceiling plate, and move it several times until the positions of the discharge energy generating elements on the element substrate and those of the discharge ports of the ceiling plate agree with each other. As a result, a problem is encountered that the tact time should increase. Also, the positioning is carried out while the measurements are made by means of a non-contact type, such as image processing method. Therefore, it is inevitable that the structure of a system becomes complicated, resulting in higher costs, and that the time required for making adjustment for each part becomes different due to the difference in the adjustments necessitated to be made by the varied precisions in which the element substrates are cut. This complicated structure of the system may hinder balancing the line tacts, and further, may make it difficult to carry out the required positioning in a shorter period of time.

Also, for the method wherein the element substrate and the ceiling plate are positioned by the provision of the positioning recesses between the plural discharge energy generating elements (heaters) on the element substrate or the method wherein the element substrate and the ceiling plate are positioned by allowing the end face of the element substrate to abut upon the abutment reference arranged for the ceiling plate, it is difficult to form the positioning recesses between the discharge energy generating elements if the devices are arranged in high density on an element substrate which is adopted for use of a highly densified recording head, such as 600 dpi or more, although this method makes it possible to carry out the positioning quickly with ease. Also, for the method wherein the end face of the element substrate is allowed to abut upon the abutment reference arranged for the ceiling plate, the positional deviation may take place between the discharge energy generating elements on the element substrate and the discharge ports or the flow path grooves of the ceiling plate depending on the precisions in which the element substrates are cut. As a result, there is a problem that this method is not adoptable for the assembling of highly densified recording heads, such as 600 dpi or more.

Therefore, the present invention is designed in consideration of the problems yet to be solved for the conventional art described above. It is an object of the invention to provide a method for manufacturing a liquid jet recording head capable of carrying out positioning in a higher precision with a shorter tact time at lower costs for the manufacture of a highly densified liquid jet head having a higher precision and reliability.

SUMMARY OF THE INVENTION

In order to achieve the objective described above, the method of the present invention for manufacturing a liquid jet recording head, which is provided with an element substrate having an array of discharge energy generating elements, and a ceiling plate having discharge ports and flow path grooves arranged in lines, the liquid jet head being assembled by the element substrate and the ceiling plate being fixed by the application of bonding agent or by use of spring or the like after positioning the discharge energy generating elements on the element substrate and the flow path grooves on the ceiling plate to present a specific positional relationship, comprises the steps of measuring the distance from a specific discharge energy generating element on the element substrate to the end face of the element substrate in the arrangement direction of discharge energy generating elements, and calculating the difference between the measured distance and the distance set in advance for the ceiling plate; of overlaying the element substrate and the ceiling plate, and enabling the abutment reference of the ceiling plate in the arrangement direction of the flow path grooves to abut upon the end face of the element substrate; and of moving relatively for retraction the end face of the element substrate in abutment with the abutment reference of the ceiling plate in the direction in which the end face parts from the abutment reference in accordance with the result of calculation obtained in the calculating step, hence the element substrate and the ceiling plate being positioned and assembled.

Also, the method of the present invention for manufacturing a liquid jet recording head, which is provided with an element substrate having an array of discharge energy generating elements, and a ceiling plate having discharge ports and flow path grooves arranged in lines, the liquid jet head being assembled by the element substrate and the ceiling plate being fixed by the application of bonding agent or by use of spring or the like after positioning the discharge energy generating elements on the element substrate and the flow path grooves on the ceiling plate to present a specific positional relationship, comprises the steps of measuring the distance from a specific discharge energy generating element on the element substrate to the end face of the element substrate in the arrangement direction of discharge energy generating elements, and calculating the difference between the measured distance and the distance set in advance for the ceiling plate; of overlaying the element substrate and the ceiling plate, and enabling the abutment reference of the ceiling plate in the arrangement direction of the flow path grooves to abut upon the end face of the element substrate; and of moving relatively for retraction the end face of the element substrate in abutment with the abutment reference of the ceiling plate in the direction in which the end face parts from the abutment reference in accordance with the result of calculation obtained in the calculating step and the correction value calculated in consideration of the compression resulting from the abutment, the positional deviation, and some others, hence the element substrate and the ceiling plate being positioned and assembled.

Now, for the method of the present invention for manufacturing a liquid jet recording head, it is preferable that the distance set in advance for the ceiling plate is the distance from a specific flow path groove or discharge port corresponding to the specific discharge energy generating element on the element substrate to the abutment reference in the arrangement direction of the flow path grooves.

Also, it is preferable for the method of the present invention for manufacturing a liquid jet recording head to calculate a correction value in consideration of the compression resulting from the abutment, the positional deviation, and some others from the distribution of measured values of the element substrates and ceiling plates after positioning and fixing the element substrates and ceiling plates, and feed back such correction value for determining the amount of retraction.

Further, it is preferable for the method of the present invention for manufacturing a liquid jet recording head that the correction value calculated in consideration of the compression resulting from the abutment, the positional deviation, and some others is obtained in accordance with the result of calculation on the basis of a first distance from a specific discharge energy generating element on the element substrate to the end face of the element substrate and the distance set in advance for the ceiling plate by overlaying the element substrate and the ceiling plate, and subsequently, enabling the end face of the element substrate and the abutment reference of the ceiling plate in the arrangement direction of flow path grooves to abut upon each other, and then, after the ceiling plate and the element substrate are positioned and fixed by moving relatively the end face of the element substrate and the abutment reference of the ceiling plate in the direction in which the end face and reference part from each other, the distance from the end face of the element substrate to a specific flow path groove is measured to calculate the positional precision between the measured value and the first distance, and a correction value is worked out from the distribution of the positional precisions, and fed back to correct the result of calculation for determining the restoring amount of abutment.

Also, it may be possible to structure the method of the present invention for manufacturing a liquid jet recording head so that the position of the push jig for compressing the ceiling plate or the element substrate is measured and stored when the end face of the element substrate abuts upon the abutment reference of the ceiling plate; the position of the push jig is continuously measured when the end face of the element substrate is moved relatively in the direction in which the face parts from the abutment reference of the ceiling plate, and the retraction movement is suspended when the difference between the measured position of the push jig and the stored measurement becomes identical to a specific amount of retraction or to a value close thereto. Also, it may be possible to arrange the structure of the method of the present invention so that a load sensor is provided for the retraction jig for performing retraction when the end face of the element substrate is moved relatively in the direction in which the face parts from the abutment reference of the ceiling plate after the face abuts upon the abutment reference; and the load sensor is continuously read to perform retraction by restoring the retraction jig in a distance substantially equal to a specific amount of retraction from the point indicating the change of load to present the increase more than the specific amount.

Further, it may be possible to arrange the structure of the method of the present invention for manufacturing a liquid jet recording head so that the ceiling plate is fixed, the element substrate moves onto the ceiling plate, and the element substrate abuts upon the abutment reference of the ceiling plate, and then, retraction is performed or that the element substrate is fixed, the ceiling plate moves onto the element substrate, and the abutment reference of the ceiling plate abuts upon the element substrate, and then, retraction is performed.

Also, it is preference for the method of the present invention for manufacturing a liquid jet recording head that the discharge energy generating elements are electrothermal transducing devices.

In accordance with the present invention, the method for manufacturing a liquid jet recording head makes it possible to combine an element substrate and a ceiling plate so that the discharge energy generating elements on the element substrate and the flow path grooves on the ceiling plate present a specific positional relationship, thus fixing them by the application of bonding agent or the like to assemble a liquid jet recording head. In this method, the distance is measured from a specific discharge energy generating element on the element substrate to the end face of the element substrate in the arrangement direction of discharge energy generating elements, and calculating the difference between the measured distance and the distance set in advance for the ceiling plate; the element substrate and the ceiling plate are overlaid to enable the abutment reference of the ceiling plate in the arrangement direction of the flow path grooves to abut upon the end face of the element substrate; and the end face of the element substrate in abutment with the abutment reference of the ceiling plate is moved relatively for retraction in the direction in which the end face parts from the abutment reference in accordance with the result of calculation obtained in the calculating. Then, after the abutment reference of the ceiling plate abuts upon the end face of the element substrate by means of the push jig, the element substrate is moved for positioning by means of the retraction jig from that position in the direction in which it parts from the abutment reference of the ceiling plate in an amount equal to the difference between the distance from the abutment reference of the ceiling plate to a specific discharge port or flow path groove, and the distance from the end face of the element substrate to a specific discharge energy device. In this manner, positioning becomes possible at lower costs in a shorter tact time and in a higher precision, hence manufacturing a highly reliable and highly densified liquid jet recording head.

Also, in accordance with the method of the present invention for manufacturing a liquid jet recording head, it is possible to measure the deviations of positional precisions in the state after positioning is actually made by the retraction on the basis of the result of calculation in the calculation step when moving the end face of the element substrate that abuts upon the abutment reference of the ceiling plate in the direction in which it parts from the abutment reference. Then a correction value is worked out for the amount of retraction from the distributional condition of such amounts of deviation. This correction value is fed back for determining the corrected amount of restoration. In accordance with the restoring amount thus corrected, positioning is performed in a higher precision at lower costs and in a shorter tact time, hence making it possible to manufacture a highly reliable and highly densified liquid jet recording head.

DETAILED DESCRIPTION OF THE PREFERRED EMBODIMENTS

In conjunction with the accompanying drawings, the description will be made of the embodiments in accordance with the present invention.

Figure 1A:
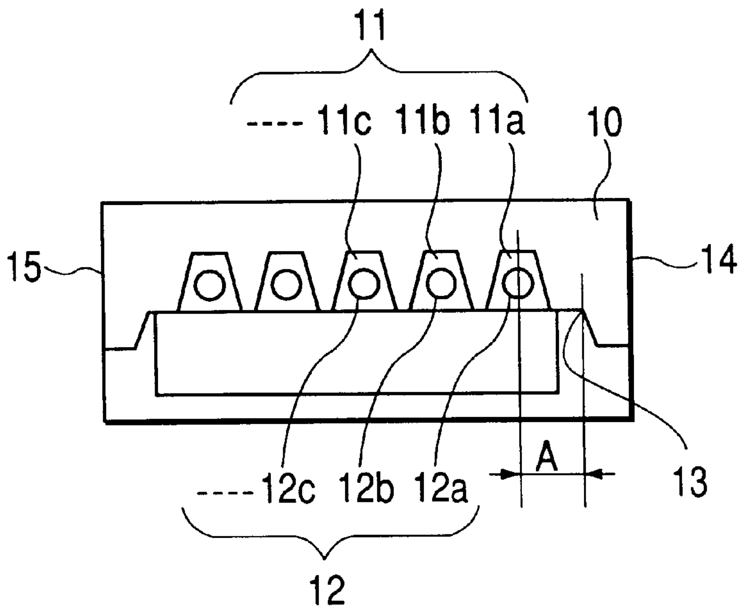
FIG. 1A is a front view which schematically shows a ceiling plate that constitutes a liquid jet recording head.
Figure 1B:
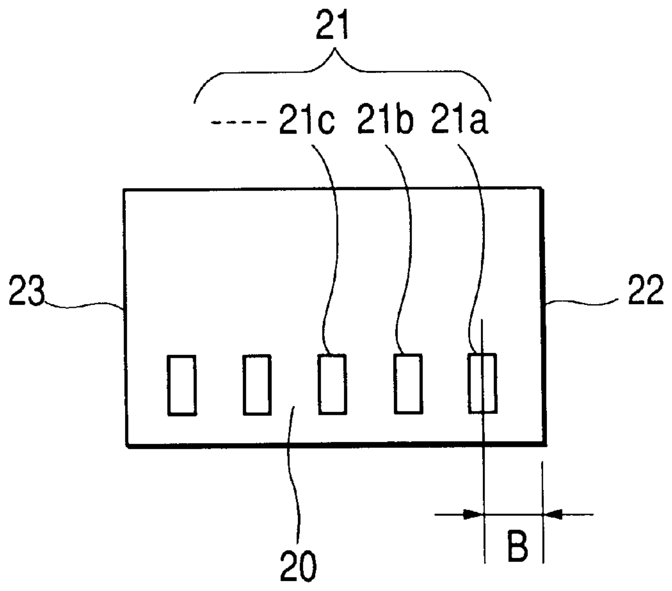
FIG. 1B is a plan view which schematically shows an element substrate that also constitutes the liquid jet recording head.

FIG. 1A is a front view which schematically shows a ceiling plate that constitutes a liquid jet recording head. FIG. 1B is a plan view which also schematically shows an element substrate that constitutes the liquid jet recording head.

In FIG. 1A, there are formed for a ceiling plate 10, a plurality of flow path grooves 11*a*, 11*b*, 11*c*, and . . . , (in FIG. 1A, it is assumed that the flow path groove in the rightmost position is defined as the first flow path groove 11*a*), and a plurality of discharge ports 12*a*, 12*b*, 12*c*, and . . . (it is assumed that the discharge port in the rightmost position is defined as the first discharge port 12*a*). On the location where the first flow path groove 11*a* and the first discharge port 12*a* are adjacent to each other, the abutment reference 13 is formed to regulate the position of the element substrate 20 by allowing it to abut upon this reference. Then, of both side faces of the ceiling plate 10, the face on the abutment reference 13 side is designated by a numeral 14, and the other face, 15. The distance A from the center of the first flow path groove 11*a* or the first discharge port 12*a* to the abutment reference 13 is determined by a designed value, and the precision of manufacture is less than approximately ±2 $\mu$m.

In the meantime, there are formed on the element substrate 20, a plurality of discharge energy generating elements (hereinafter, referred to simply as heaters) 21*a*, 21*b*, 21*c*, and . . . (in FIG. 1B, it is assumed that the heater in the rightmost position is defined as the first heater 21*a*). On both cut faces 22 and 23, the cut face on the first heater side is designated by a reference numeral 22. Then, the distance B from the cut face 22 on the first heater side to the center of the first heater 21*a* on the element substrate 20 is varied within a range of ±10 $\mu$m per element substrate depending on the precisions in which the element substrates 20 are cut and separated from a wafer. This distance B can be measured individually by a method such as an image processing.

Figure 2A:
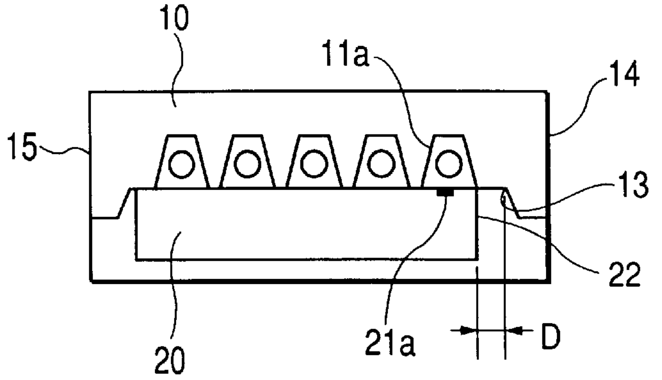
FIGS. 2A, 2B and 2C are views which illustrate each step of the sequential positioning in accordance with one embodiment of the method of the present invention for manufacturing a liquid jet recording head.
Figure 2B:
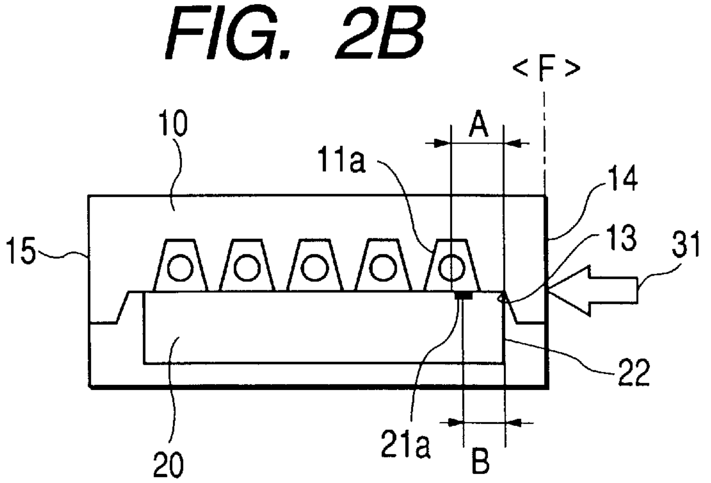
Figure 2C:
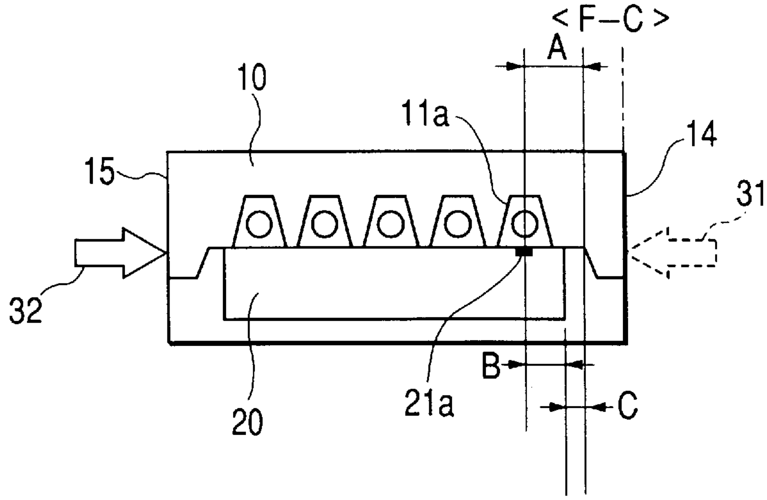

Now, the description will be made of the positioning and assembling procedures of the ceiling plate 10 and the element substrate 20. FIGS. 2A to 2C are views which illustrate each step of the sequential positioning in accordance with one embodiment of the method of the present invention for manufacturing a liquid jet recording head.

At first, the distance B from the center of the first heater 21*a* on the element substrate 20 to the cut face 22 on the first heater side is measured individually by means of the image processing or the like. Then, the difference C (=A−B) between the distance B thus measured and the distance A from the center of the first flow path groove 11*a* (or the first discharge port 12*a*), which has been set as a designed value, is calculated in order to record this difference C as the data of the element substrate 20.

Then, as shown in FIG. 2A, the ceiling plate 10 moves onto the element substrate 20. At this juncture, the positional relationship between the ceiling plate 10 and the element substrate 20 is such that the cut face 22 of the element substrate 20 is set in a position apart from the abutment reference 13 of the ceiling plate by approximately 0.1 to 0.2 mm (distance D in FIG. 2A). This arrangement is necessary because of the need for the element substrate 20 should be located inside the abutment reference 13 of the ceiling plate 10 perfectly when the ceiling plate 10 moves onto the element substrate 20, and also, because the accuracy required for the movement of such members as carrier fingers should be considered when used for carrying and placing the ceiling plate 10.

After that, as shown in FIG. 2B, the side face 14 of the ceiling plate 10 is compressed by use of a push jig 31 arranged for compressing the side face 14 of the ceiling plate 10 on the abutment reference side. Thus, the abutment reference 13 of the ceiling plate 10 is pressed until it abuts upon the cut face 22 of the element substrate 20 on the first heater side. In this respect, the structure is arranged so that the position of the push jig 31 is measured by means of a positional sensor (not shown). Then, in the state where the abutment reference 13 abuts upon the cut face 22 as shown in FIG. 2B, the position of the push jig 31 at F is measured and stored.

In this state, if the distance B from the first heater 21*a* on the element substrate 20 to the cut face 22 is equal to the distance A from the first flow path groove 11*a* of the ceiling plate 10, the difference C (=A−B) is zero. Thus, the positions of heaters 21*s* (21*a*, 21*b*, and . . . ) and those of the flow path grooves 11*s* (11*a*, 11*b*, and . . . ) are in agreement to make it possible to obtain a recording head having excellent discharge characteristics. Usually, however, the distance B from the first heater 21*a* on the element substrate 20 to the cut face 22 varies in an amount of ±10 $\mu$m per element substrate depending on the precisions in which the substrates are cut. As a result, it is extremely rare that the distances A and B are identical. It requires an extremely difficult operation to bring the distance A and distance B to be perfectly in agreement with each other.

Now, therefore, in accordance with the present embodiment, the distance B from the center of the first heater 21*a* to the cut face 22 is measured for each of the element substrates 20, at the same time, calculating the difference C (=A−B) between the distance A of the ceiling plate, which is set in advance, and the distance B. Then, using the difference C to be recorded as the data of each element substrate 20, the correction is made for the positional relationship between the element substrate 20 and the ceiling 10.

As shown in FIG. 2C, by means of the retraction jig 32 which is arranged correspondingly on the side opposite to the side where the push jig 31 is arranged, the ceiling plate 10 moves so that the abutment reference 13 of the ceiling plate returns in the direction apart from the cut face 22 by a distance of the difference C (=A−B) from the state where the abutment reference 13 of the ceiling plate 10 abuts upon the cut face 22 of the element substrate on the first heater side. The position of the push jig 31 is continuously measured by a positioning sensor (not shown) when the retraction jig 32 operates. Then, until the push jig 31 reaches the position of <F−C>, the retraction jig is in operation to move the ceiling plate 10 accordingly. For example, the amount of movement of the push jig 31 is measured by means of the positioning sensor, and when such amount of movement becomes equal to the distance C or arrives at a value close to the distance C, the operation of the retraction jig 32 is suspended. In this manner, it is possible to bring the positions of the flow path grooves 11*s* of the ceiling plate 10 and heater 21*s* on the element substrate 20 to be in agreement with each other. Here, it is preferable to arrange the structure so that the push jig 31 is provided with spring capability to be movable in accordance with the amount of compression exerted by the retraction jig 32.

In accordance with the embodiment described above, when the ceiling plate 10 moves to enable the abutment reference 13 of the ceiling plate 10 to shift in the direction apart from the cut face 22 of the element substrate 20, the position of the push jig 31 is detected by the positional sensor in order to control the amount of such movement. Thus, the amount of the movement is determined as described above. However, it may be possible to provide a load sensor (not shown) for the retraction jig 32 that enables the ceiling plate 10 to move so that the abutment reference 13 of the ceiling plate 10 is retracted in the direction apart from the cut face 22 of the element substrate 20. This load sensor should be capable of detecting changes in the load which may increase greatly when the retraction jig 32 is in contact with the side face 15 of the ceiling plate 10. Here, the structure is arranged to control the amount of the movement by means of such load sensor. In other words, when the ceiling plate 10 moves so that the abutment reference 13 of the ceiling plate 10 shifts from the state where it abuts upon the cut face 22 of the element substrate 20 in the direction in which it parts from the cut face 22, the retraction jig 32 is actuated to operate. However, with the additional provision of a load sensor (not shown) for the retraction jig 32, changes in the load on the retraction jig 32 are continuously detected to make it possible to sense the position where the load increases more than a given amount due to the contact with the side face 15 of the ceiling plate 10 as the retraction jig 32 moves. Then, with this position as a reference, the retraction jig 32 shifts from it in an amount equal to the difference C of the distance which has been calculated in advance. In this way, the amount of such movement is controlled as described above.

In accordance with the present embodiment, it is necessary to measure the distance B from the center of the first heater 21*a* on the element substrate 20 to the cut face 22 before moving the ceiling plate 10 onto the element substrate 20 as described earlier, but it may be possible to separate the measurement of the element substrate 20 from the steps to follow in order to avoid any influence that may be exerted on the positioning precision even if the position of the element substrate 20 should change in the steps in the following process. In other words, the distance B from the first heater 21*a* on the element substrate 20 to the cut face 22 is measured at first. Then, the data on such measurement and the data on the calculation of the distance A set for the ceiling plate 10 in advance are prepared for each of the element substrate. Each of them can be carried to the next processing station with the calculation data and some others. In this manner, it becomes possible to separate the measurement and calculation processes from the steps that should be taken in the next process.

Figure 3A:
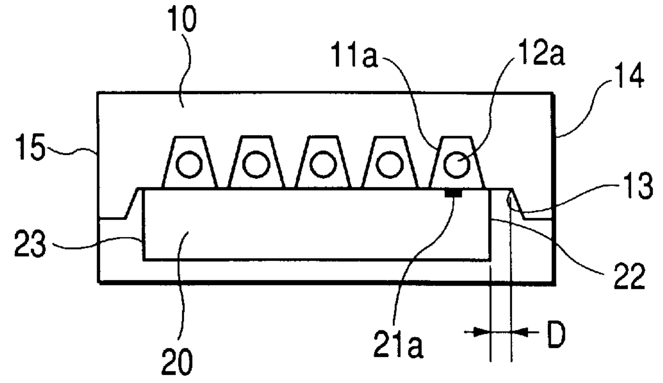
FIGS. 3A, 3B and 3C are views which illustrate each step of the sequential positioning in accordance with another embodiment of the method of the present invention for manufacturing a liquid jet recording head.
Figure 3B:
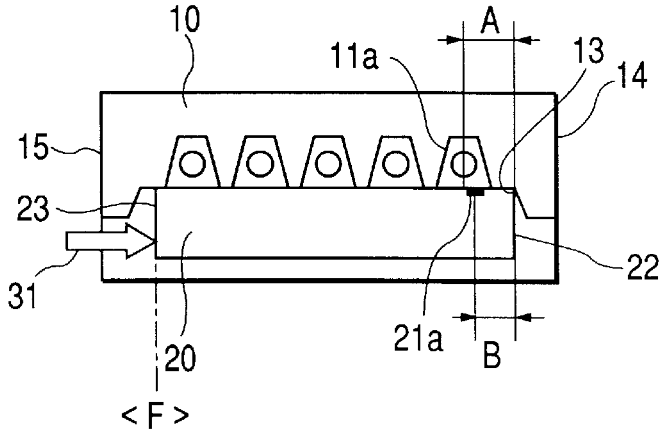
Figure 3C:
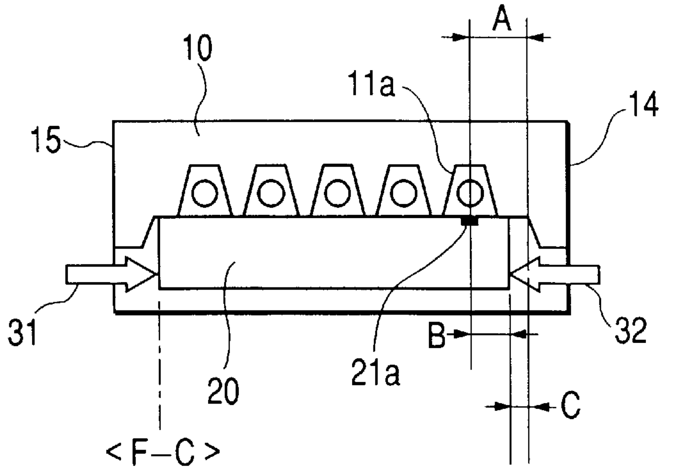

Also, as described above, the element substrate 20 is fixed, while the ceiling plate 10 is made movable, and then, the movement of the ceiling plate is adjusted by means of the push jig 31 and the retraction jig 32. However, as shown in FIGS. 3A to 3C, it is also possible to position the element substrate and the ceiling plate in good precision in such a manner that after the element substrate 20 moves onto the fixed ceiling plate 10, the push jig 31 and the retraction jig 32 are arranged to confront the cut faces 23 and 22 of the element substrate 20, respectively, and that by means of these jigs, the element substrate 20 is allowed to move relatively by use of the technique described earlier with respect to the ceiling plate 10.

Now, in accordance with the embodiment described in conjunction with FIGS. 2A to 2C and 3A to 3C, the positioning precision is enhanced even with the varied cutting precisions of the element substrates being taken into consideration, and the positioning can be made quickly with ease. However, for the liquid jet recording head whose assembling has been executed after retraction is processed on the basis of the amount of retraction obtained by calculation, there are some cases where deviation may take place between the positions of the heaters on the element substrate and the flow path grooves (or discharge ports) of the ceiling plate.

Therefore, the inventor et al hereof have further studied the method assiduously. As a result, it is found that the deviation in the positions of the ceiling plate and element substrate may occur for the reasons given below when applying the positioning technique which is based on the abutment and retraction as described above.

Figure 4:
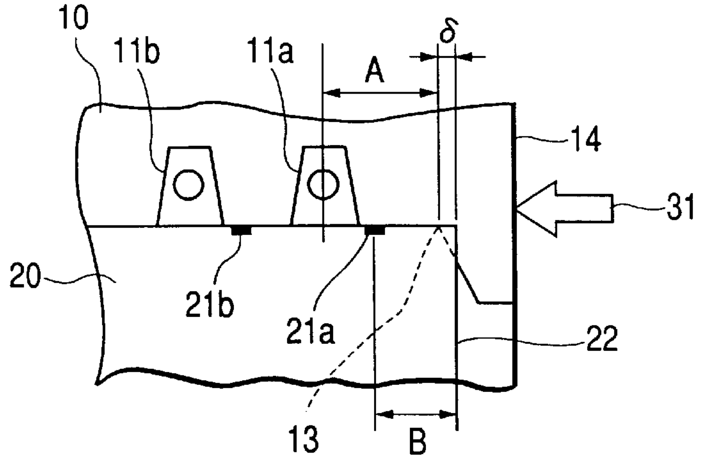
FIG. 4 is a partially enlarged view which shows the state where the abutment reference is compressed when the cut face of an element substrate abuts upon the abutment reference.

In other words, (1) as shown in FIG. 4, the abutment reference 13 of the ceiling plate 10 is compressed when it abuts upon the cut face 22 of the element substrate 20 due to its function and structure, as well as due to its configuration and material. Then, the position of the abutment reference tends to be deviated inevitably by the compressed amount $\delta$ at that time. As a result, the position that has retracted by the application of the restoring amount C (=A–B) should also be deviated by the compressed amount $\delta$.

(2) The mechanism, such as jigs or the like, which is used for compression and retraction brings about a positional deviation of a constant amount due to the backlash, rigidness, or some other factors genuine to such mechanism.

(3) The numerical value used for the calculation to obtain the amount of restorationis usually acquired by means of measurement as described earlier. However, there is a possibility that such measured value varies in certain tendency depending on the methods of measurement.

Now, it is found that the positions of the ceiling plate and element substrate are caused to deviate from a given position in certain tendency for the reasons described in the preceding paragraphs when the ceiling plate and element substrate are positioned subsequent to the retraction performed on the basis of the amount of retraction that has been obtained by calculation. Therefore, if such deviation is controlled and eliminated, it is possible to enhance the positioning precision greatly. To this end, a correction value is obtained from the distributional condition of the deviations that occur in certain tendency at each time when the ceiling plate and element substrate are positioned, and then, the correction value thus obtained is adopted for correcting the amount of restoration.

Now, in accordance with another embodiment of the method of the present invention for manufacturing a liquid jet head, the positioning precision can be enhanced greatly by correcting the amount of retraction using the correction value to be obtained from the distributional condition of deviations at each time when the ceiling plate and element substrate are positioned, hence eliminating the positional deviation between the ceiling plate and element substrate. With reference to FIGS. 4 to 7C, the description will be made of the present embodiment. As to the positional deviation resulting from the abutment and restoration, a method for calculating the correction value will be described at first.

Figure 5:
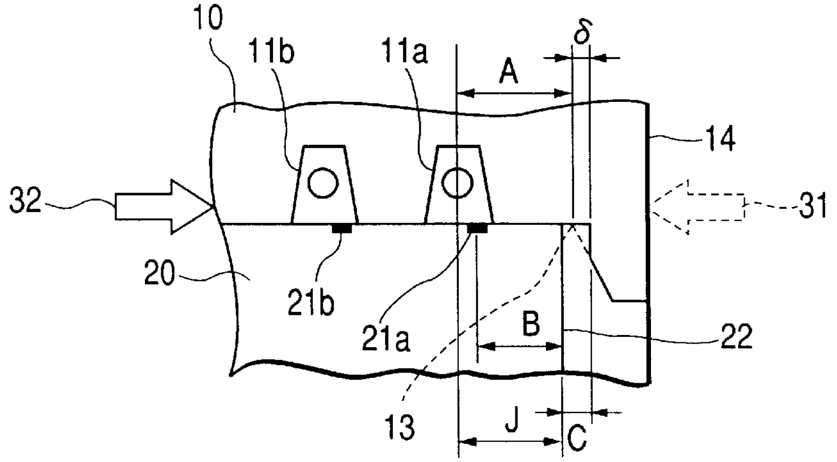
FIG. 5 is a partially enlarged view which shows that state where the abutment reference moves from the state represented in FIG. 4 in an amount of usual restoration.
Figure 6:
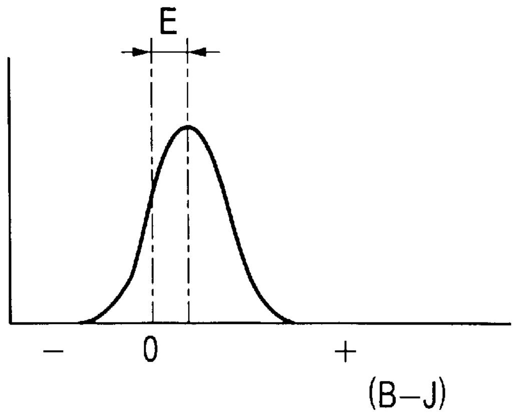
FIG. 6 is a view which shows the distribution of positioning accuracy to be used for determining the correction value obtainable from the distributional condition of positioning precisions of the ceiling plate and element substrate fixed in the state represented in FIG. 5.

When the cut face 22 of the element substrate 20 and the abutment reference 13 of the ceiling plate 10 abut upon each other, the element substrate 20 and the ceiling plate 10 are in contact in a state that the abutment reference 13 of the ceiling plate 10 is compressed as shown in FIG. 4. Retraction is conducted from this state by the amount of retraction C (=A–B) to be obtained by the calculation described earlier. This state is illustrated in FIG. 5. After the element substrate and the ceiling plate are positioned and fixed by means of such abutment and restoration, the distance J between the cut face 22 of the element substrate 20 on the first heater side and the first flow path groove 11*a* is measured to obtain the difference (B–J) between the distance J thus measured and the distance B between the first heater 21*a* and the cut face 22, which is measured in advance for the element substrate 20. This difference (B–J) is the positional deviation, namely, the positional precision, which corresponds to the compressed amount $\delta$ of the abutment reference 13, the errors due to the characteristics of the mechanism, such as a push jig, the amount of deviation resulting from the measurement method, or the like. Then, the measurement of the distance J is carried out a number of works that should be good enough for determining the tendency of the positional precision, and the distribution of the positional precisions (B–J) is examined (see FIG. 6). Thus, the bias E of the mean value of the distributed positional precisions (B–J) is adopted as a correction value.

Figure 7A:
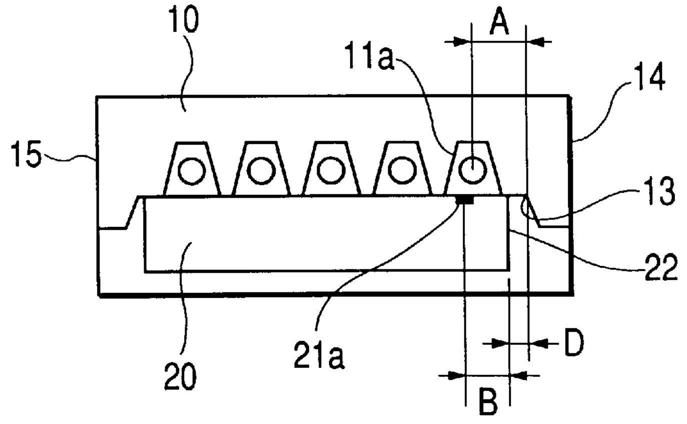
FIGS. 7A, 7B and 7C are views which illustrate each step of the sequential positioning in accordance with still another embodiment of the method of the present invention for manufacturing a liquid jet recording head.
Figure 7B:
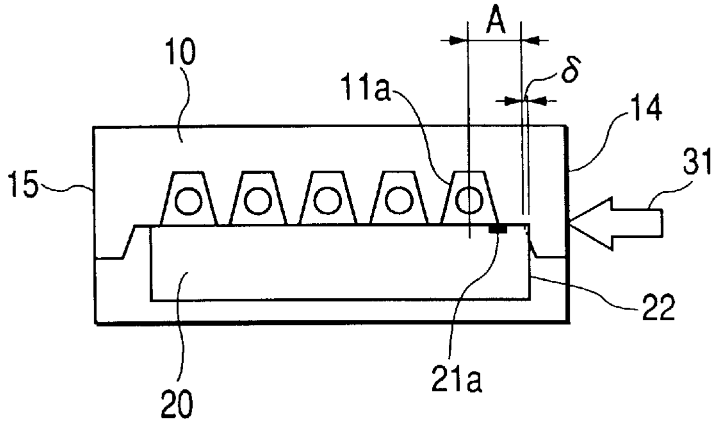
Figure 7C:
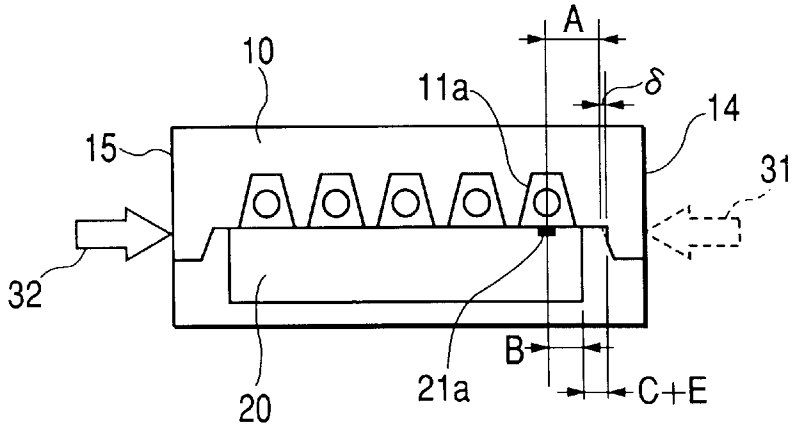
Figure 8A:
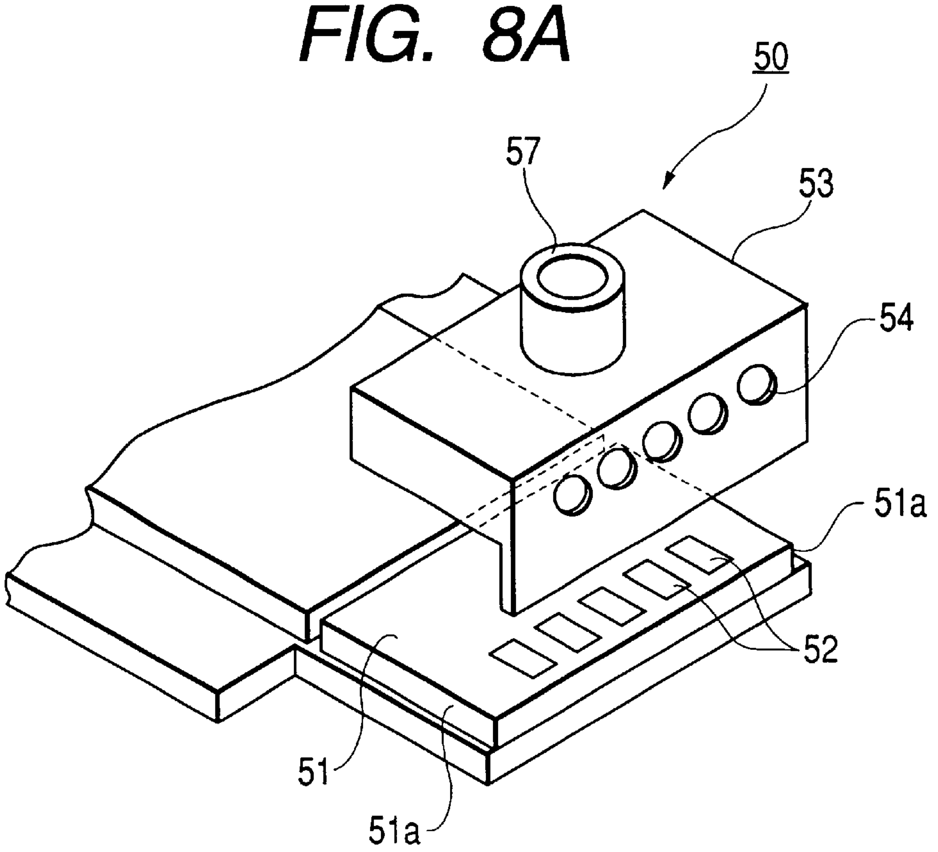
FIG. 8A is an exploded perspective view which schematically shows the structure of a liquid jet recording head.
Figure 8B:
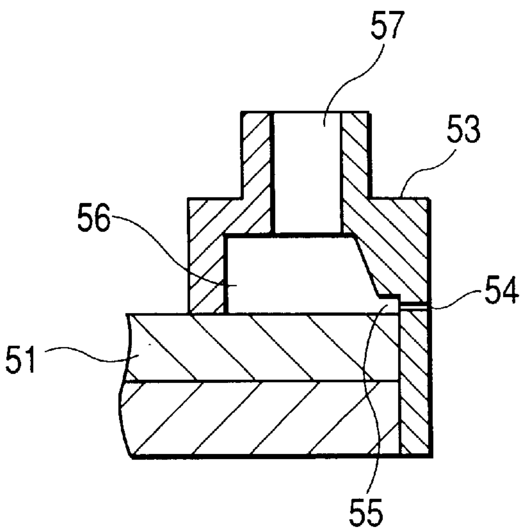
FIG. 8B is a cross-sectional view schematically showing the structure of the liquid jet recording head represented in FIG. 8A.

The correction value E thus calculated is added to the usual restoring value C which is described earlier. This value (C+E) is defined as a corrected amount of restoration. With the corrected restoring value (C+E), the retraction is executed as shown in FIGS. 7A to 7C. In other words, the ceiling plate 10 moves onto the element substrate 20 in the same manner as described in conjunction with FIGS. 2A to 2C, and then, the side face 14 of the ceiling plate 10 on the reference side is compressed by means of the push jig 31 until the abutment reference 13 of the ceiling plate 10 abuts upon the cut face 22 of the element substrate 20 on the first heater 21*a* side. After that, the difference C (=A–B) is calculated from the distance A of the ceiling plate 10 which is set in advance, and the distance B obtained in advance by measurement per element substrate 20. Then, the correction value E, which is determined in advance from the distribution of the positional precisions on the basis of the measured values with respect to the actual positional deviations between the element substrates and ceiling plates which have been positioned and fixed, is added to the difference C to obtain the corrected amount of retraction (C+E). By this amount, the ceiling plate 10 moves by means of the retraction jig 32 in the direction in which the contact face of the ceiling plate 10 parts from the cut face 22 of the element substrate 20 on the first heater side. With such correction of the restoring value C, it becomes possible to position the flow path grooves 11 of the ceiling plate 10 and heaters 21 on the element substrate 20 in good precision. Thus, in this state, the ceiling plate 10 and the element substrate 20 are bonded and fixed by the application of bonding agent or by use of spring or the like for the formation of a liquid jet recording head. In this respect, when retraction is made by means of the retraction jig 32 only by the corrected amount of retraction (C+E), such amount of movement is controlled by a method for detecting the positions of the push jig by use of a positioning sensor or controlled by use of a load sensor additionally provided for the retraction jig, among some other methods of detection.

As described above, in accordance with the present embodiment, when the element substrate and ceiling plate are positioned by means of abutting and returning, the positional deviation takes place in a certain tendency depending on the functions, configurations, methods of measurement, or the like. Therefore, the deviated amounts of the positional precision are measured after actual positioning and fixation. Then, from the distributional condition of such amounts of deviation, the correction value is obtained and fed back in order to determine the corrected amount of restoration. In this way, it becomes possible to position the element substrate and ceiling plate in a higher precision.

Also, there is known a method of positioning by means of the positioning feed back which uses an image processing apparatus. However, this method not only needs the provision of an expensive image processing apparatus, but also, requires an expended tact time due to the necessity of image processing feed back per work. Here, the method of the present embodiment makes it possible to implement positioning at lower costs in a shorter tact time.

Also, in accordance with the present embodiment described above, the element substrate 20 is fixed, while the ceiling plate 10 is made movable. Then, the movement of the ceiling plate 10 is adjusted by means of the push jig 31 and the retraction jig 32. However, as shown in FIGS. 3A to 3C, after the element substrate 20 moves onto the fixed ceiling plate 10, the push jig 31 and the retraction jig 32 are arranged to be in contact with both cut faces of the element substrate 20, respectively. Then, the arrangement is made so that the element substrate 20 moves relatively with respect to the ceiling plate 10 by use of the push jig 31 and retraction jig 32. In this way, it also becomes possible to position the element substrate and ceiling plate in a higher precision.

Also, among the liquid jet recording methods, the present invention demonstrates excellent effects particularly when it is applied to a recording head and a recording apparatus of the so-called ink jet recording type that performs recording with the formation of flying droplets by the utilization of thermal energy.

Regarding the typical structure and operational principle of the ink jet method, it is preferable for the present invention to adopt those which can be implemented using the fundamental principle disclosed in the specifications of U.S. Pat. Nos. 4,723,129 and 4,740,796, for example. This method is applicable to the so-called on-demand type recording system and a continuous type recording system as well.

To briefly describe this recording method, discharge signals are supplied from a driving circuit to electrothermal transducing elements, which serve as discharge energy generating elements, disposed on a liquid (ink) retaining sheet or liquid path. In other words, in accordance with recording information, at least one driving signal is given in order to provide recording liquid (ink) with a rapid temperature rise so that film boiling phenomenon, which is beyond nuclear boiling phenomenon, is created in the liquid, thus generating thermal energy to cause film boiling on the thermoactive surface of the recording head. Since an air bubble can be formed from the recording liquid (ink) by means of the driving signal given to an electrothermal transducing element one to one, this method is effective particularly for the on-demand type recording method. By the development and contraction of the bubble, the liquid (ink) is discharged through a discharge port to produce at least one droplet. The driving signal is more preferably in the form of pulses because the development and contraction of the bubble can be effectuated instantaneously and appropriately. The liquid (ink) is discharged with quicker response. The driving signal in the form of pulses is preferably such as disclosed in the specifications of U.S. Pat. Nos. 4,463,359 and 4,345,262. In this respect, the temperature increasing rate of the thermoactive surface is preferably such as disclosed in the specification of U.S. Pat. No. 4,313,124 for an excellent recording in a better condition.

The present invention is applicable to the structure of the recording head shown in each of the above-mentioned specifications wherein the structure is arranged to combine the discharging ports, liquid flow paths, and the electrothermal transducing elements (linear type liquid flow paths or right-angled liquid flow paths). Besides, it is equally and effectively applicable to the structure such as disclosed in the specifications of U.S. Pat. Nos. 4,558,333 and 4,459,600 in which the thermal activation portions are arranged in a curved area.

In addition, the present invention is effectively applicable to the structure disclosed in Japanese Patent Application Laid-Open No. 59-123670 wherein a common slit is used as the discharging ports for plural electrothermal transducing elements, and to the structure disclosed in Japanese Patent Application Laid-Open No. 59-138461 wherein an aperture for absorbing pressure wave of the thermal energy is formed corresponding to the discharge ports.

Further, as a recording head for which the present invention can be utilized effectively, there is the full-line type recording head whose length corresponds to the maximum width of a recording medium recordable by such recording apparatus. For the full-line type recording head, it may be possible to adopt either a structure whereby to satisfy the required length by combining a plurality of recording heads or a structure arranged by one recording head integrally formed.

In addition, the present invention is effectively applicable to an exchangeable recording head of a chip type that can be electrically connected with the apparatus main body, the ink supply therefor being made possible from the apparatus main body, when mounted on the apparatus main body or to the use of a cartridge type recording head provided integrally for the recording head itself.

Also, it is preferable to additionally provide a recording head with recovery means and preliminarily auxiliary means because these additional means will contribute to making the effectiveness of a recording apparatus more stabilized. To name them specifically, these are capping means, cleaning means, suction or compression means, preheating means such as electrothermal transducing elements or heating elements other than such transducing elements or the combination of those types of elements, and a predischarge means for performing discharge other than the regular discharge with respect to the recording head.

Further, as the recording modes of a recording apparatus, the present invention is not only applicable to a recording mode in which only one main color such as black is used for recording, but also, the invention is extremely effective in applying it to an apparatus having plural recording heads provided for use of at least one of multiple colors prepared by difference colors or a full-color prepared by mixing colors, irrespective of whether the recording heads are integrally structured or structured by a combination of plural recording heads.

In the embodiments of the present invention described above, while the ink has been described as liquid, it may be an ink material which is solidified below the room temperature but soften or liquefied at the room temperature or soften or liquefied within a temperature range of the temperature adjustment generally practiced for an ink jet recording, that is, not lower than 30° C. but not higher than 70° C. In other words, it should be good enough if only ink is liquefied at the time of giving recording signals for use. In addition, while positively preventing the temperature rise due to thermal energy by the use of such energy as an energy to be consumed for changing states of ink from solid to liquid, or by the use of the ink which will be solidified when left intact for the purpose of preventing the ink from being evaporated, it may be possible to adopt for the present invention the use of an ink having a nature of being liquefied only by the application of thermal energy, such as an ink capable of being discharged as ink liquid by enabling itself to be liquefied anyway when the thermal energy is given in accordance with recording signals, and an ink which will have already begun solidifying itself by the time it reaches a recording medium. In such a case, it may be possible to retain ink in the form of liquid or solid in the recesses or through holes of a porous sheet such as disclosed in Japanese Patent Application Laid-Open No. 54-56847 or 60-71260 in order to enable the ink to face the electrothermal transducing elements. In the present invention, the most effective method for the various kinds of ink mentioned above is the one that enables the film boiling method to be effectuated as described above.

Furthermore, as the mode of the recording apparatus of the present invention, it may be possible to adopt a copying apparatus combined with a reader, in addition to the image output terminal for a computer or other information processing apparatus. Also, it may be possible to adopt a mode of a facsimile equipment provided with transmitting and receiving functions.

As described above, in accordance with the present invention, the abutment on the abutment reference and the retraction based upon the result of calculation are performed when positioning the ceiling plate and the element substrate. Then, when effectuating the restoration, a correction value is added to the amount of restoration, hence the retraction is performed in accordance such corrected amount of restoration. As a result, positioning is performed in a higher precision. Hence, the ceiling plate and the element substrate are positioned in an enhanced precision at lower costs with a shorter tact time, and further, it is made possible to attain the manufacture of a highly precise and highly densified liquid jet recording head.

What is claimed is:

1. A method for manufacturing a liquid jet recording head provided with an element substrate having an array of discharge energy generating elements, and a ceiling plate having discharge ports and flow path grooves arranged in lines, the liquid jet recording head being formed by the element substrate and the ceiling plate being fixed together after positioning the discharge energy generating elements on the element substrate and the flow path grooves on the ceiling plate to present a specific positional relationship, the method comprising the following steps of:

measuring a distance from a specific discharge energy generating element on the element substrate to an end face of the element substrate in an arrangement direction of the discharge energy generating elements, calculating a difference between the measured distance and a distance from an abutment reference of the ceiling plate to one of a specific flow path groove and a discharge port corresponding to the specific discharge energy generating element, and storing the calculated value;

overlaying the element substrate and the ceiling plate, and enabling the abutment reference of the ceiling plate in an arrangement direction of the flow path grooves to abut upon the end face of the element substrate; and moving relatively for retraction the end face of the element substrate in a direction such that the end face separates from the abutment reference in accordance with a result of said calculating step, thereby positioning the element substrate relative to the ceiling plate.

2. A method for manufacturing a liquid jet recording head provided with an element substrate having an array of discharge energy generating elements, and a ceiling plate having arrays of discharge ports and flow path grooves, the liquid jet recording head being formed by the element substrate and the ceiling plate being fixed together after positioning the discharge energy generating elements on the element substrate and the flow path grooves on the ceiling plate to present a specific positional relationship, the method comprising the following steps of:

measuring a distance from a specific discharge energy generating element on the element substrate to an end face of the element substrate in the arrangement direction of the discharge energy generating elements, calculating a difference between the measured distance and a distance from an abutment reference of the ceiling plate to one of a specific flow path groove and a discharge port corresponding to the specific discharge energy generating element, and storing the calculated value;

overlaying the element substrate and the ceiling plate, and enabling the abutment reference of the ceiling plate in an arrangement direction of the flow path grooves to abut upon the end face of the element substrate; and moving relatively for retraction the end face of the element substrate in a direction such that the end face separates from the abutment reference in accordance with a result of said calculating step and a correction value calculated in consideration of a compression resulting from the abutment and a positional deviation, thereby positioning the element substrate relative to the ceiling plate.

3. A method for manufacturing a liquid jet recording head according to claim 2, wherein the correction value in consideration of the compression resulting from the abutment and the positional deviation is calculated from a distribution of measured values of element substrates and ceiling plates after positioning and fixing the element substrates and ceiling plates, and the correction value is fed back for determining an amount of retraction.

4. A method for manufacturing a liquid jet recording head according to claim 2, wherein the correction value in consideration of the compression resulting from the abutment and the positional deviation is obtained in accordance with a result of a calculation on the basis of a first distance from a specific discharge energy generating element on the element substrate to the end face of the element substrate and the distance from the reference abutment of the ceiling plate to the one of the specific flow path groove and the discharge port corresponding to the specific discharge energy generating element, by overlaying the element substrate and the ceiling plate, and subsequently, enabling the end face of the element substrate and the abutment reference of the ceiling plate in the arrangement direction of flow path grooves to abut upon each other, and then, after the ceiling plate and the element substrate are positioned and fixed by moving relatively the end face of the element substrate and the abutment reference of the ceiling plate in the direction such that the end face and the abutment reference separate from each other, the distance from the end face of the element substrate to a specific flow path groove is measured to calculate a positional precision between the measured value and the first distance, and a correction value is worked out from a distribution of the positional precisions, and fed back to correct the result of calculation for determining a restoring amount of abutment.

5. A method for manufacturing a liquid jet recording head according to claim 1, further comprising the steps of:

measuring and storing a position of a push jig for compressing the ceiling plate or the element substrate when the end face of the element substrate abuts upon the abutment reference of the ceiling plate;

continuously measuring the position of the push jig when the end face of the element substrate is moved relatively in the direction such that the face separates from the abutment reference of the ceiling plate; and suspending the retraction movement when the difference between the measured position of the push jig and the stored measurement becomes identical to a specific amount of retraction or to a value close thereto, wherein, then, the element substrate and the ceiling plate are positioned and assembled.

6. A method for manufacturing a liquid jet recording head according to claim 1, further comprising the steps of:

providing a load sensor for a retraction jig for performing retraction when the end face of the element substrate is moved relatively in the direction such that the end face separates from the abutment reference of the ceiling plate after the end face abuts upon the abutment reference; and continuously reading the load sensor to perform retraction by restoring the retraction jig a distance substantially equal to a specific amount of retraction from a point indicating a change of load to present an increase more than the specific amount, wherein, then, the element substrate and the ceiling plate are positioned and assembled.

7. A method for manufacturing a liquid jet recording head according to claim 1, wherein the ceiling plate is fixed, the element substrate moves onto the ceiling plate, and the element substrate abuts upon the abutment reference of the ceiling plate, and then, retraction is performed.

8. A method for manufacturing a liquid jet recording head according to claim 1, wherein the element substrate is fixed, the ceiling plate moves onto the element substrate, and the abutment reference of the ceiling plate abuts upon the element substrate, and then, retraction is performed.

9. A method for manufacturing a liquid jet recording head according to claim 1, wherein the discharge energy generating elements are electrothermal transducing devices.

10. A method for manufacturing a liquid jet recording head according to claim 2, further comprising the steps of:

measuring and storing a position of a push jig for compressing the ceiling plate or the element substrate when the end face of the element substrate abuts upon the abutment reference of the ceiling plate;

continuously measuring the position of the push jig when the end face of the element substrate is moved relatively in the direction such that the end face separates from the abutment reference of the ceiling plate; and suspending the retraction movement when the difference between the measured position of the push jig and the stored measurement becomes identical to a specific amount of retraction or to a value close thereto, wherein, then, the element substrate and the ceiling plate are positioned and assembled.

11. A method for manufacturing a liquid jet recording head according to claim 2, further comprising the steps of:

providing a load sensor for a retraction jig for performing retraction when the end face of the element substrate is moved relatively in the direction such that the end face separates from the abutment reference of the ceiling plate after the end face abuts upon the abutment reference; and continuously reading the load sensor to perform retraction by restoring the retraction jig a distance substantially equal to a specific amount of retraction from a point indicating a change of load to present an increase more than the specific amount, wherein, then, the element substrate and the ceiling plate are positioned and assembled.

12. A method for manufacturing a liquid jet recording head according to claim 2, wherein the ceiling plate is fixed, the element substrate moves onto the ceiling plate, and the element substrate abuts upon the abutment reference of the ceiling plate, and then, retraction is performed.

13. A method for manufacturing a liquid jet recording head according to claim 2, wherein the element substrate is fixed, the ceiling plate moves onto the element substrate, and the abutment reference of the ceiling plate abuts upon the element substrate, and then, retraction is performed.

14. A method for manufacturing a liquid jet recording head according to claim 2, wherein the discharge energy generating elements are electrothermal transducing devices.

* * * * *